(12) United States Patent
Hebbal

(10) Patent No.: US 11,768,680 B2
(45) Date of Patent: Sep. 26, 2023

(54) ITERATIVE METHOD AND DEVICE FOR DETECTING AN APPROXIMATE ZONE OCCUPIED BY THE COMPUTER CODE OF AN OPERATING SYSTEM CORE IN A MEMORY

(71) Applicant: ORANGE, Issy-les-Moulineaux (FR)

(72) Inventor: Yacine Hebbal, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 118 days.

(21) Appl. No.: 17/622,960

(22) PCT Filed: Jun. 24, 2020

(86) PCT No.: PCT/HR2020/051100
§ 371 (c)(1),
(2) Date: Dec. 27, 2021

(87) PCT Pub. No.: WO2020/260823
PCT Pub. Date: Dec. 30, 2020

(65) Prior Publication Data
US 2022/0229660 A1 Jul. 21, 2022

(30) Foreign Application Priority Data
Jun. 28, 2019 (FR) ..................... 1907160

(51) Int. Cl.
*G06F 9/44* (2018.01)
*G06F 8/75* (2018.01)
(52) U.S. Cl.
CPC ..................... *G06F 8/75* (2013.01)

(58) Field of Classification Search
None
See application file for complete search history.

(56) References Cited

U.S. PATENT DOCUMENTS

| 9,836,379 B2* | 12/2017 | Badea ................. G06F 11/3636 |
| 10,656,628 B2* | 5/2020 | Feiten .............. G05B 19/41815 |
| 2015/0096028 A1* | 4/2015 | Olshanov .............. G06F 21/554 726/23 |
| 2017/0115919 A1* | 4/2017 | Subramanian ......... G11C 29/08 |

(Continued)

OTHER PUBLICATIONS

English translation of the Written Opinion of the International Searching Authority dated Oct. 20, 2020 for corresponding International Application No. PCT/FR2020/051100, filed Jun. 24, 2020.

(Continued)

*Primary Examiner* — Anna C Deng
(74) *Attorney, Agent, or Firm* — David D. Brush

(57) ABSTRACT

An iterative method and device for detecting an approximate area occupied by computer code of a core of an operating system in a memory, the area including one or more ranges. The method includes: detecting at least one target address in the memory; determining a first area delimited by two of these target addresses; disassembling these areas at least into a part determined during the previous iteration; detecting target addresses pointed to in the disassembled areas; and searching for an additional memory range starting after the second target address obtained on the last iteration and including only computer code.

11 Claims, 9 Drawing Sheets

(56) References Cited

U.S. PATENT DOCUMENTS

2017/0277594 A1* 9/2017 Yoon .................. G06F 11/1451

OTHER PUBLICATIONS

International Search Report dated Oct. 7, 2020 for corresponding International Application No. PCT/FR2020/051100, dated Jun. 24, 2020.
Written Opinion of the International Searching Authority dated Oct. 7, 2020 for corresponding International Application No. PCT/FR2020/051100, filed Jun. 24, 2020.
Yacine Hebbal, "Semantic monitoring mechanisms dedicated to security monitoring in IaaS cloud," Sep. 18, 2017 (Sep. 18, 2017), XP055673201.
French Search Report dated Mar. 19, 2020 for corresponding French Application No. 1907160, filed Jun. 28, 2019.

* cited by examiner

ITERATIVE METHOD AND DEVICE FOR DETECTING AN APPROXIMATE ZONE OCCUPIED BY THE COMPUTER CODE OF AN OPERATING SYSTEM CORE IN A MEMORY

CROSS-REFERENCE TO RELATED APPLICATIONS

The present application is a Section 371 National Stage Application of International Application No. PCT/FR2020/051100, filed on Jun. 24, 2020, and published as WO 2020/260823 A1 on Dec. 30, 2020, not in English, the contents of which are hereby incorporated by reference in their entireties.

BACKGROUND OF THE INVENTION

The invention relates to the general field of the supervising of computer code.

It more specifically relates to a method and a device for detecting an area occupied by computer code.

The invention applies preferably but without limitation to detecting the location of a core code executing in the memory of a virtual machine.

In this context, the invention can be implemented by a hypervisor or by a third-party device using memory management functions of a hypervisor.

Specifically, the location of the core code in the memory of a virtual machine is unknown to the hypervisor. In addition, this location varies according to the type and version of the operating system of the virtual machine and is liable to randomly change after each restart of the virtual machine.

Two main techniques are known to automatically identify the location of the core code of a virtual machine from a hypervisor.

The first technique attempts to identify the location of the core code by the identification of the functions of this latter through their markers in a binary code. But this first technique does not work on an optimized core code in which function markers are virtually non-existent.

The second technique attempts to identify the location of the core code by the identification of a first arbitrary instruction in the code of the virtual machine, the rest of the core code which is located before and after this instruction being obtained via a method of disassembly until the detection of a datum, marking the border of the core code with the core data. This second technique supposes that the core code is contiguous and there are no data in the middle of the code. This technique is therefore not effective in cases where data are present in the middle of the core code as is the case with the Windows (trademark) core.

These techniques are therefore not satisfactory.

SUBJECT AND SUMMARY OF THE INVENTION

The invention consequently relates to another solution to automatically identify the area occupied by computer code in a memory.

More precisely, the invention relates to a method for detecting an approximate area occupied by the computer code of a core of an operating system in a memory, this area including one or more ranges in this memory. This method includes:

an iterative method including:
a first iteration including:
  a step of detecting at least one target address in the memory;
  a step of determining an area delimited by a first target address and by a second target address; and
at least a second iteration including:
  a step of disassembling at least a part of the area determined during the preceding iteration;
  a step of detecting at least one target address pointed to by a computer code instruction contained in said at least one disassembled part of an area; and
  a step of determining an area delimited by a first of these target addresses and by a second of these target addresses detected during this second iteration;
a stopping condition being verified when no new target address was detected during the last iteration; and
a step of searching for an additional memory range starting just after the second target address obtained on the last iteration and including only computer code;
said approximate area occupied by the computer code in the core of the operating system being delimited by the first target address obtained on the last iteration and by the largest address of said additional memory range.

Correlatively, the invention relates to a device for detecting an approximate area occupied by the computer code of a core of an operating system in a memory, this area including one or more ranges in said memory, this device including a module able to implement a detecting method as mentioned above.

Since the area occupied by the computer code cannot be determined with certainty, it is classified as an approximate area. In most cases, this area is determined to over 99%.

Thus, and in general, the invention proposes to detect, by successive iterations, target addresses in the memory, to delimit areas pointed to by these target addresses until a stopping condition and to complete the area thus identified by an area of code starting just after the last identified target address.

It should be recalled that a target address is the address of an instruction pointed to by another instruction, for example call (instruction of target address CALL type), or jump (instruction of target address JMP type).

The method is particularly advantageous in that it:
makes it possible to detect a code area including non-contiguous ranges;
is efficient since it quickly progresses through its iterative phase by dealing exclusively with target addresses;
it is accurate by the implementation of the additional searching step which makes it possible to accurately detect the end of the code area.

The target addresses used in the first iteration can be detected by any means for example by randomly disassembling portions of binary code to search it for an instruction of CALL or JMP type.

In a particular embodiment of the detecting method according to the invention, the target addresses detected during the first iteration are obtained in a table of interruption vectors or in a table of a system call manager of a data area of the memory.

This feature is very advantageous since it makes it possible to very quickly find a large number of target addresses.

In a particular mode, the detecting method according to the invention includes, for at least one iteration:
a step of grouping target addresses detected during this iteration and preceding iterations into one or several groups, a group of target addresses including a single target address or several target addresses separated pairwise by a distance less than a determined distance, these groups being ordered; and a step of identifying groups including at least a determined number of target addresses;

said area determined during this iteration being a range delimited by the smallest target address and by the largest target address of these groups.

This step of grouping is known by the name of "clustering". It aims to identify ranges of binary code with a high density of target addresses, which statistically contain a high proportion of computer code and very few data. Only these ranges are disassembled which greatly accelerates the process.

In a particular embodiment, the detecting method according to the invention includes:

a step of identifying, in the approximate area, at least one range of binary code that corresponds to data; and a step of excluding this or these binary code ranges of the approximate area.

This step aims to eliminate data areas that might have been wrongly identified as code areas. It is important to note that this step is implemented after the iterative process such that it is possible that it will be executed only once.

In a particular embodiment of the invention, a range of binary code corresponding to data is identified when it includes, with at least one determined density, binary code portions representing:

an instruction of NOP type; or an instruction of INT3 type; or an invalid instruction; or a conditional jump instruction not preceded by a test instruction or an arithmetical instruction, or an instruction comprising operands of incompatible size.

In a particular embodiment, the detecting method according to the invention includes:

a step consisting in verifying whether binary code excluded from said approximate area corresponds to a target address pointed to by an instruction; and where applicable;

a step of reintegrating this target address into the approximate area.

This step aims to reintegrate into the approximate area instructions that might have been wrongly eliminated because they are contained in ranges with high data density.

In a particular embodiment, the detecting method according to the invention includes:

a step of searching the approximate area for constants of the size of a pointer and when said constants are identified, a step of searching:

for a said first constant corresponding to the smallest address of the first group of addresses or to the address preceding the first group of addresses; and a said second constant corresponding to or following the largest address of the approximate area;

a step of delimiting the approximate area by the first constant and the second constant unless there exists some binary code representative of data between this first constant and the smallest address of the first address group or between the largest address of the approximate area and the second constant.

This feature makes it possible to very accurately delimit the approximate area in its bottom part and in its top part.

In an embodiment of the method according to the invention, the core executes in the random access memory of a virtual machine.

Correspondingly, in an embodiment, the detecting device according to the invention includes a virtual machine and a hypervisor, the module of this device being implemented by the hypervisor for detecting the approximate area occupied by the computer code of the core of an operating system when it executes in the random access memory of the virtual machine.

In a particular embodiment, the different steps of the detecting method are determined by computer program instructions.

Consequently, the invention also relates to a computer program on an information medium, this program being liable to be implemented in a computer, this program including instructions suitable for implementing the steps of a method as described above.

This program can use any programming language, and be in the form of source code, object code, or intermediate code between source code and object code, such as in a partly compiled form, or in any other desirable form.

The invention also relates to an information or recording medium readable by a computer, and including instructions of a computer program as mentioned above.

The information or recording medium can be any entity or device capable of storing the program. For example, the medium can include a storage means, such as a ROM, for example a CD-ROM or a microelectronic circuit ROM, or else a magnetic recording means, for example a hard disk.

Moreover, the information or recording medium can be a transmissible medium such as an electrical or optical signal, which can be conveyed via an electrical or optical cable, by radio or by other means. The program according to the invention can in particular be downloaded over a network of Internet type.

Alternatively, the information or recording medium can be an integrated circuit wherein the program is incorporated, the circuit being suitable for executing or for being used in the execution of the method in question.

BRIEF DESCRIPTION OF THE DRAWINGS

Other features and advantages of this invention will become apparent from the description given below, with reference to the appended drawings which illustrate an exemplary embodiment thereof devoid of any limitation. In the figures.

DETAILED DESCRIPTION OF THE INVENTION

Figure 1A:
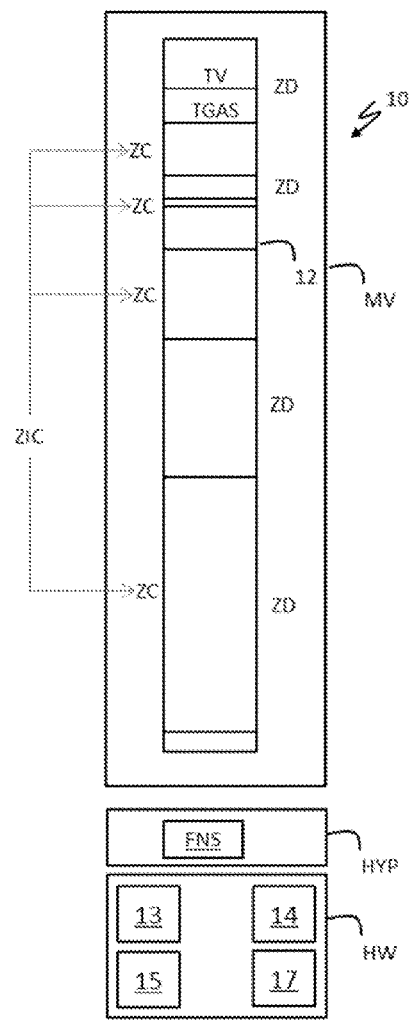
FIG. 1A shows the hardware architecture of a device in accordance with a particular embodiment of the invention.

FIG. 1A shows the hardware architecture of a device 10 in accordance with a particular embodiment of the invention.

This device 10 includes a hardware layer HW, a hypervisor HYP and a virtual machine MV.

The hypervisor HYP manages the hardware resources of a device 10, particularly a processor 13, a random access memory 14, a hard disk 15 and communicating means 17.

The hard disk 15 further constitutes a recording medium in accordance with the invention, readable by the processor 13 and on which is here recorded a computer program PROG in accordance with the invention.

The computer program PROG defines a functional (and here software) module, configured to implement the steps of the detecting method according to the invention which will be subsequently described.

The random access memory (physically formed by the component 14) of this virtual machine MV conventionally includes a user space and a core space. The core space includes a core of an operating system in the strict sense, modules and drivers.

In FIG. 1A, only the core 12 (sometimes called main core) is shown. It includes areas of computer code ZC and areas of data ZD.

The invention relates to a method for determining the area ZIC occupied by the computer code, namely the uniting of the code areas ZC.

In the exemplary embodiment described here, this method is implemented using functions FNS of the hypervisor HYP, for example, by a function of reading the virtual memory of the VM, and by a function of reading the registers of the processor 13.

Figure 1B:
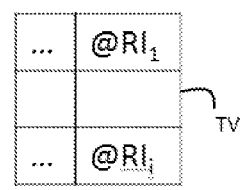
FIG. 1B shows a table of interruption vectors.

In a known manner, one of the data areas of the core in the random access memory includes a table TV of interruption vectors. Such a table TV shown in FIG. 1B includes a set of rows, each row including in particular the address @$RI_i$ a routine for managing an interruption INTi. An interruption management routine is triggered in reaction to an interruption, such as an exception such as a division by 0, etc.

Figure 1C:
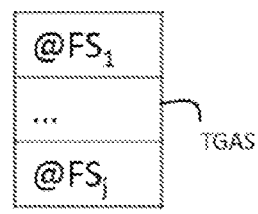
FIG. 1C shows a table of system calls.

Moreover, a core area includes a system call manager. This system call manager uses a data area ZD containing a table TGAS shown in FIG. 1C, each row of this table including the address @FSj of a system function FSj supplied by the operating system of the virtual machine.

It is recalled that a system function or "system call" makes it possible to communicate directly with the core of the operating system of the virtual machine MV. For example, to write to the hard disk 15, a program of the user space must involve calls of system functions which monitor the writes to the disk commanded from the program. The system functions guarantee the security of the data and their integrity on the disk by monitoring the applications of the user space.

Figure 2:
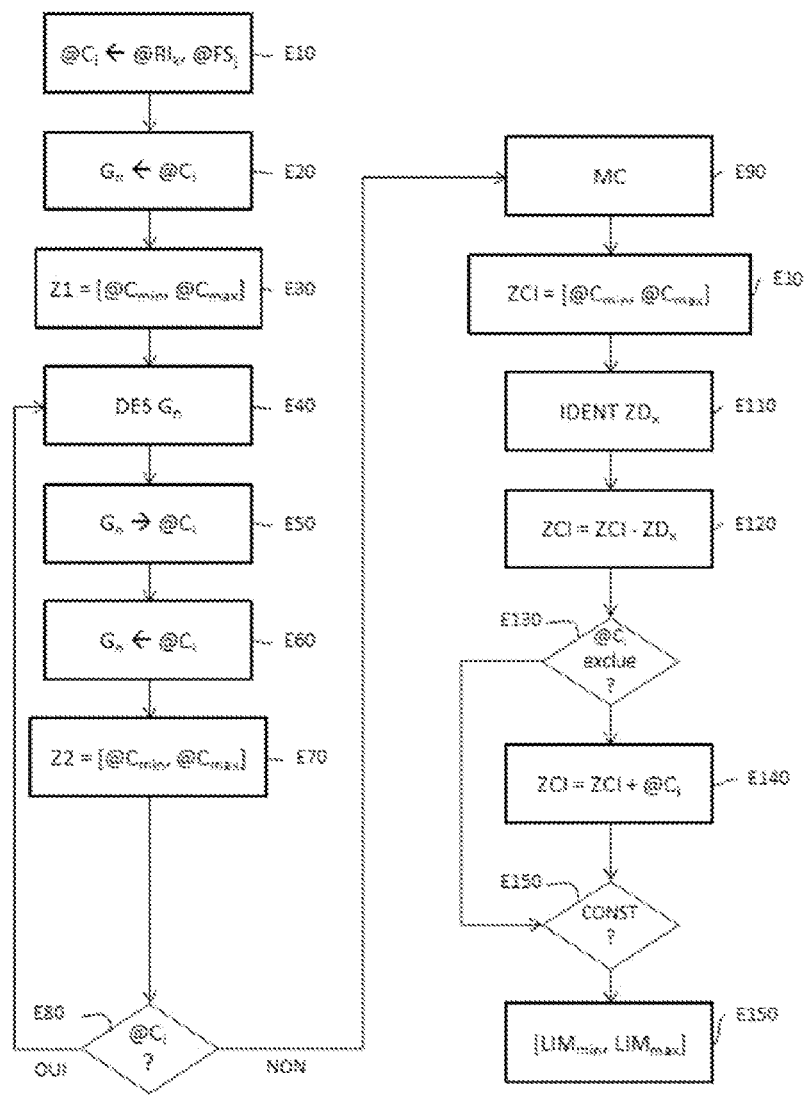
FIG. 2 illustrates, in the form of a flow chart, the main steps of a method for detecting an approximate area occupied by the computer code of a core of an operating system of the device of FIG. 1A, this method being in accordance with a particular embodiment of the invention.

FIG. 2 shows in the form of a flow chart the main steps of a method in accordance with the invention, implemented by the hypervisor HYP, for detecting an approximate area ZIC occupied by the computer code of the core of the operating system in the random access memory of the virtual machine.

Figure 3A:
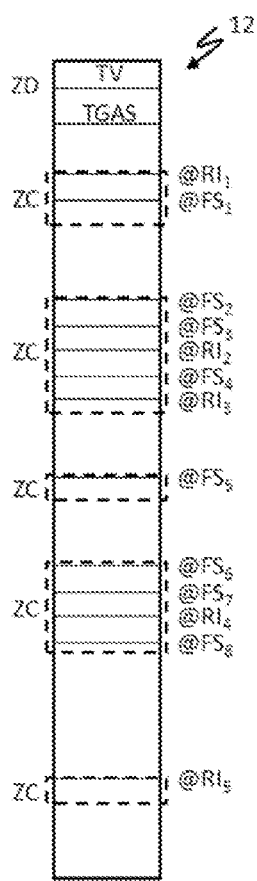
FIG. 3A shows the state of variables used by the detecting method of FIG. 2, after the step of detecting target addresses of the first iteration of this method.

During a step E10, the hypervisor reads the table TV of interruption vectors and identifies the table of system calls TGAS for identifying the addresses @$RI_k$ in the random access memory of the interruption routines and the addresses @$FS_j$ in the random access memory of the system functions. These addresses constitute target addresses @$C_i$ within the meaning of the invention. These addresses are shown in FIG. 3A. They mark the beginning either of an interruption routine $RI_i$ or a system function $FS_j$, each in a code area ZC.

During a step E20, the hypervisor groups the target addresses @$C_i$ obtained during the step E10.

A group of target addresses $G_n$ includes either a target address or several target addresses separated pairwise by a distance less than a determined distance (for example 1 Mb). During this same step E20, the hypervisor HYP identifies the groups $G_n$ including at least a determined number of target addresses (for example 10); the other groups are not chosen.

Figure 3B:
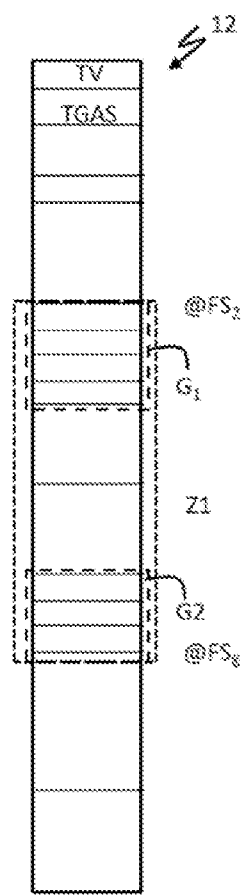
FIG. 3B shows the state of variables used by the detecting method of FIG. 2, after a step of grouping these target addresses.

In the example of FIG. 3B, two groups $G_1$, $G_2$ are thus identified.

During a step E30, the hypervisor determines a range Z1 delimited, in this example, by the smallest address @$C_{min}$ and by the largest address @$C_{max}$ of all the groups $G_n$. In this case @$C_{min}$ is the start address of the system function $FS_2$ and @$C_{max}$ is the start address of the system function $FS_8$.

In the example of FIG. 3B, the range Z1 includes a target address @FS5 which belongs neither to the group $G_1$ nor to the group $G_2$.

Then the hypervisor HYP executes at least a second iteration.

This second iteration includes a step E40 of disassembling the groups $G_k$ identified during the preceding iteration. As a reminder, a disassembly of addresses or groups of addresses is implemented by means of a disassembler. A disassembler is a program that translates machine language, and therefore an executable file, into assembly language, or "low level" language which represents the machine language in a form understandable to a human. For this purpose disassembly libraries are used, for example the library known as Udis86 which executes in the core code. During a disassembly, it is possible to know how many octets are to be taken into account for correctly disassembling an instruction. This item of information is specifically indicated in the first octet of the instruction. Thus, if the disassembly is started from a first octet of an instruction, it is known how many octets are to be taken into account for disassembling the instruction.

During a step E50, the hypervisor HYP identifies and records the target addresses @$C_i$ pointed to by computer code instructions contained in the disassembled groups $G_k$.

During a step E60, the hypervisor HYP groups the target addresses @$C_i$ obtained during the step E50, and preceding iterations (step E10 of the first iteration, and step E50 of the preceding occurrences of the second iteration if there are any).

As for the step E10 of the first iteration, a group of target addresses includes either a single target address or several target addresses separated pairwise by a distance less than a determined distance. During this same step E60, the hypervisor identifies the groups $G_i$ including at least a determined number of target addresses.

The determined distance on the one hand and the determined number on the other hand can be identical or different from those used during the step E20 of the first iteration.

Figure 3C:
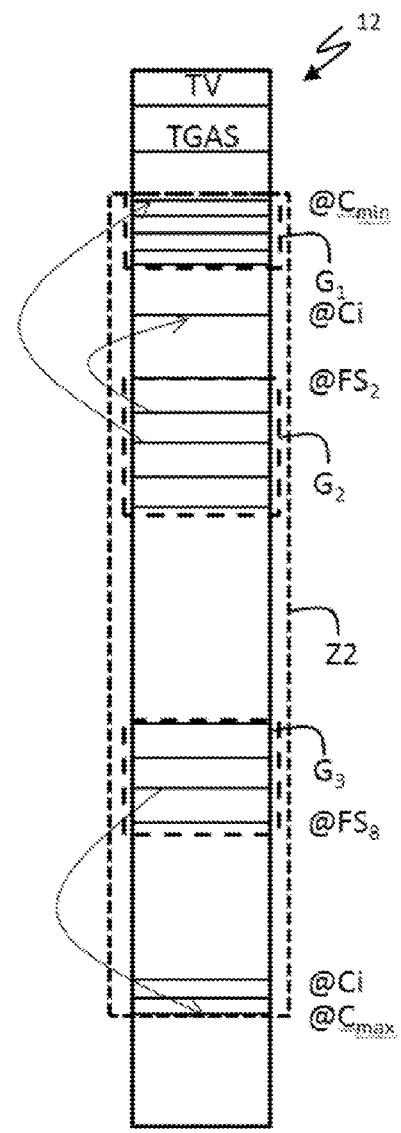
FIG. 3C shows the state of variables used by the detecting method of FIG. 2, after a step of grouping target addresses identified during a second iteration of this method.

In the example of FIG. 3C, a new group $G_1$ is identified in addition to a first group $G_2$ and a second group $G_3$ identified in the first iteration and respectively known as $G_1$ and $G_2$ during the preceding iteration, illustrated by FIG. 3B. Note that the groups are ordered in that all the addresses of the group $G_i$ are less than the addresses of the group $G_{i+1}$. In another example, new target addresses $@C_i$ may then enlarge the groups identified during a preceding iteration.

During a step E70, the hypervisor determines an area Z2 composed, in this example, by a memory range delimited by the smallest target address $@C_{min}$ and by the largest target address $@C_{max}$ of these groups $G_1$ to $G_3$.

During a step E80 the hypervisor verifies that no new target address has been identified. If such is the case, the iterative method stops. Otherwise the step E80 is followed by a second occurrence of the disassembling step E40 applied to the groups identified in step E60 and a new iteration executes (steps E40 to E80).

When the condition of stopping of the iterative method is verified, the step E80 is followed by a step E90 of searching for an additional memory range MC starting just after the largest target address $@C_{max}$ obtained in step E70 of the last iteration and containing only computer code.

Specifically, at the target address $@C_{max}$, there is normally found, by virtue of its structure, a computer code instruction.

The step E90 therefore consists in identifying the end of the computer function that includes this instruction. It can be carried out by searching for the first function-end instruction (RET or conditional JUMP instruction) which is not followed by a target address of an instruction of redirection of this same function.

This additional memory MC is therefore the memory range [$@MC_{min}$, $@MC_{max}$] wherein:
  $@MC_{min}$ follows the address $@C_{max}$ obtained in step E70 of the last iteration and;
  $@MC_{max}$ is the address of this RET or conditional JUMP instruction.

Figure 3D:
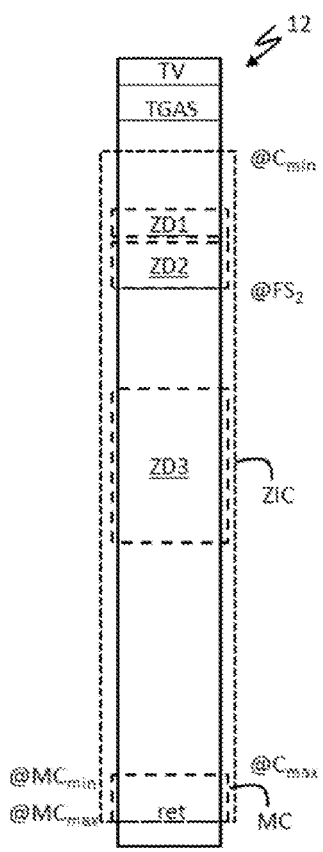
FIG. 3D shows the state of variables used by the detecting method of FIG. 2, after delimiting an approximate area occupied by computer code of the core.

During a step E100, the hypervisor determines that the approximate area ZIC occupied by the computer code of the core of the virtual machine is the range delimited by the addresses $@C_{min}$ and $@MC_{max}$ (FIG. 3D).

In the embodiment described here, the detecting method according to the invention includes a step E110 for identifying in the area ZIC determined in step E100, any binary code ranges ZD corresponding to data and a step E120 to exclude, if they exist, these binary code ranges of the approximate area ZIC.

Specifically the approximate area ZIC determined in step E100 can include data areas ZDx. In the case of FIG. 3D, it includes three data areas ZD1, ZD2 and ZD3.

In the embodiment described here, a binary code range is identified as a data area ZD when it includes, with at least one determined density, binary code representing:
  an instruction of NOP type; or
  an instruction of INT3 type; or
  an invalid instruction; or
  a conditional jump instruction not preceded by a test instruction or an arithmetical instruction, or
  an instruction comprising operands of incompatible sizes.
  These instructions are representative of a data area.

For example, the addresses of these instructions are recorded, these addresses are grouped as done in step E60 using a predetermined distance and a number, and each identified group is considered as a data range.

By way of example, the appendix A illustrates a range [0x82834fcd, 0x8283500f] of binary code including instructions NOP, INVALID, INT3, add [eax], al for which the operands [eax] and al are incompatible since they are of different sizes, 32 bits and 8 bits respectively.

If the largest address $@MC_{max}$ is part of the excluded binary code areas then the largest target address $@C_{max}$ is assigned to the largest address $@MC_{max}$.

Figure 3E:
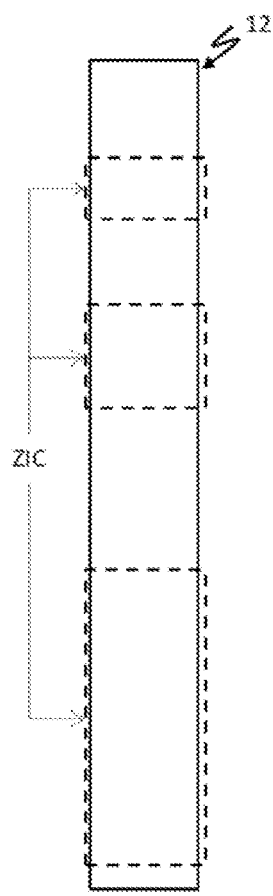
FIG. 3E shows the state of variables used by the detecting method of FIG. 2 after identifying and excluding data ranges in this approximate area.

FIG. 3E shows the approximate area ZIC, in three ranges, once these two data ranges have been removed, and more precisely:
  a first range including the range ZD1, the range ZD2 and the binary code between these two ranges; and
  of the binary range ZD3.

In this example the binary code between the ranges ZD1 et ZD2 is a wrongfully excluded area of code ZC since it contains an instruction corresponding to a target address pointed to by an instruction of CALL type (see FIG. 3C, the target address $@C_i$ pointed to from an instruction of the group $G_2$).

Consequently, in this embodiment, the detecting method according to the invention includes:
  a step E130 consisting in verifying whether or not binary code excluded (in step E120) from the area ZIC corresponds to a target address pointed to by an instruction of CALL type corresponding to a function start; and where applicable;
  a step E140 of reintegrating the function pointed to by this target address into the area ZIC.

Figure 3F:
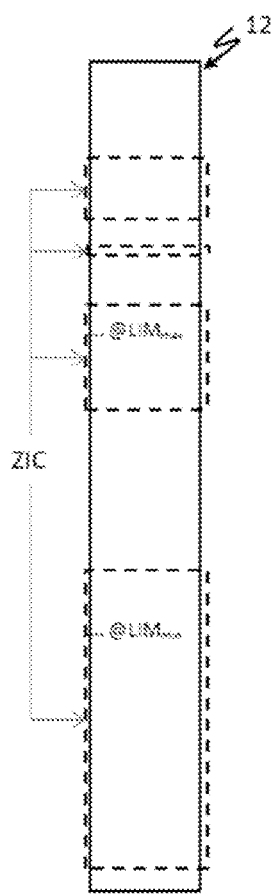
FIG. 3F shows the state of variables used by the detecting method of FIG. 2 after excluding data ranges in the approximate area and reintegrating wrongfully excluded instructions.

FIG. 3F shows the code area ZIC, in four ranges, once the wrongfully excluded code area in E120 has been reintegrated in step E130.

In the exemplary embodiment described here, the detecting method according to the invention includes a step for attempting to accurately delimit the code area ZIC.

To do this the detecting method proposes to search the approximate area ZIC for constants that could constitute these limit addresses.

More precisely, in this embodiment, the detecting method according to the invention includes a step E150 of searching said area occupied by computer code ZIC for constants of the size of a pointer (which corresponds to the size of an address).

When these constants are identified, the method searches for the constants $@LIM_{min}$ and $@LIM_{max}$ respectively corresponding to
  the smallest address of the first group of addresses $G_1$ or the address preceding the first address group $G_1$; and in:
  the largest address $@MC_{max}$ or at the following address $@MC_{max}$.

These two constants $@LIM_{min}$ and $@LIM_{max}$ where applicable correspond to the start address and the end address of the core.

If there is no binary code representing data either between $@LIM_{min}$ and the smallest address of the first group $G_1$, or between the first address of the approximate area and $@LIM_{max}$, the method delimits (step E160) the area ZIC by the address $@LIM_{min}$ and the address $@LIM_{max}$. Otherwise the method delimits the area ZIC by the smallest address of the first group $G_1$ and the largest address $@MC_{max}$ of the additional area obtained in step E70.

Figure 3G:
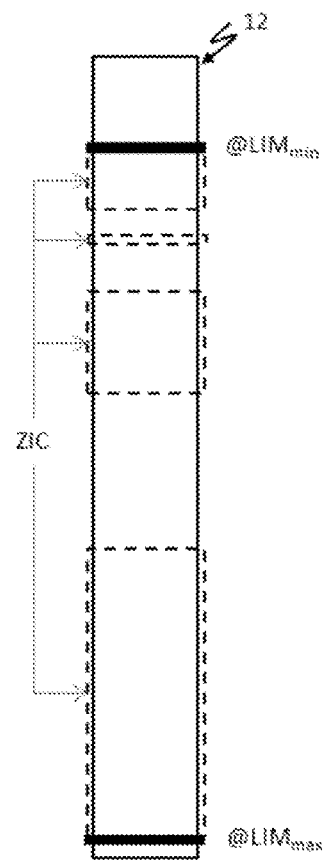
FIG. 3G shows the state of variables used by the detecting method of FIG. 2 after delimiting the approximate area.

FIG. 3G shows the code area ZIC delimited by these two constants identified in the code area ZIC shown in FIG. 3F.

The method is here described for a core of an operating system in a random access memory. It can also apply to the identification of the code of a core of an operating system in a memory dump.

The method has been described in the context of a Linux core for which the interruptions table and the system call table can be easily identified. For other operating systems, one uses the interruptions table and where applicable the address of the system call manager and any address reachable from the latter.

APPENDIX A

```
0x82834fcd add [eax], al
0x82834fcf add [eax], al
0x82834fd1 add [eax], al
0x82834fd2 nop
0x82834fd3 nop
0x82834fd5 add [eax], al
0x82834fd7 add [eax], al
0x82834fd9 add [eax], al
0x82834fda int3
0x82834fdb int3
0x82834fdc int3
0x82834fdd int3
0x82834fde int3
0x82834fdf int3
0x82834fe1 jnz 0xef
0x82834fe3 add [eax], al
0x82834fe5 add [eax], al
0x82834fe7 add [eax], al
0x82834fe9 add [eax], al
0x82834feb add [eax], al
0x82834fed add [eax], al
0x82834fef add [eax], al
0x82834ff1 add [eax], al
0x82834ff3 invalid
0x82834ff5 invalid
0x82834ff7 add [eax], al
0x82834ff9 add [eax], al
0x82834ffa nop
0x82834ffb nop
0x82834ffd invalid
0x82834fff invalid
0x82835001 adc [eax], al
0x82835003 add [ecx + eax], cl
0x82835007 add [esp + esi], al
0x8283500a or [esp + ecx], dh
0x8283500d xor al, 0x10
0x8283500f xor al, 0x14
```

The invention claimed is:

1. A method for detecting an area occupied by computer code of a core of an operating system in a memory, the area including one or more ranges in the memory, the method being implemented by a detecting device and including:
   an iterative method including:
   a first iteration including:
   detecting at least one target address in the memory; and
   determining an area delimited by a first target address and a second target address; and
   at least a second iteration including:
   disassembling at least a part of the area determined during a preceding iteration;
   detecting at least one target address pointed to by a computer code instruction contained in the at least one disassembled part of the area; and
   determining an area delimited by a first said target address and a second target address detected during the second iteration; and
   a stopping condition being verified when no new target address was detected during a last iteration; and
   searching for an additional memory range starting just after the second target address obtained on the last iteration and including only the computer code;
   the area occupied by the computer code in the core of the operating system being delimited by the first target address obtained on the last iteration and by a largest address of the additional memory range.

2. The method for detecting the area occupied by the computer code of the core of the operating system in the memory as claimed in claim 1, wherein the at least one target address detected during said first iteration is obtained in a table of interruption vectors or in a table of a system call manager of a data area of the memory.

3. The method for detecting the area occupied by the computer code of the core of the operating system in the memory as claimed in claim 1, the method including, for at least one of the first iteration or the second iteration:
   grouping target addresses during an iteration and preceding iterations into at least one group, a group of target addresses including a single target address or several target addresses separated pairwise by a distance less than a determined distance, groups being ordered; and
   the groups including at least a determined number of target addresses;
   the area determined during an iteration being a range delimited by a smallest target address and by a largest target address of the groups.

4. The method for detecting the area occupied by the computer code of the core of the operating system in the memory as claimed in claim 1, the method further including:
   identifying, in the area, at least one range of binary code that corresponds to data; and
   excluding the at least one binary code range of the area.

5. The method for detecting the area occupied by the computer code of the core of the operating system in the memory as claimed in claim 4, wherein the at least one binary code range corresponding to the data is identified when the at least one binary code range includes, with at least one determined density, binary code portions representing:
   an instruction of NOP type; or
   an instruction of INT3 type; or
   an invalid instruction; or
   a conditional jump instruction not preceded by a test instruction or an arithmetical instruction, or
   an instruction comprising operands of incompatible size.

6. The method for detecting area occupied by the computer code of the core of the operating system in the memory as claimed in claim 4, the method further including:
   verifying whether binary code excluded from the area corresponds to a target address pointed to by an instruction of a CALL type;
   in response to the binary code excluded from the area corresponding to the target address pointed to by the instruction of the CALL type,
   reintegrating a function pointed to by a target address into the area.

7. The method for detecting area occupied by the computer code of the core of the operating system in the memory as claimed in claim 3, the method further including:
   searching the area for constants of a size of a pointer and when the constants are identified, the searching including:
   for a first constant corresponding to the smallest address of a first group of addresses or to an address preceding the first group of addresses; and
   a second constant corresponding to the largest address of the area or an address following the largest address of the area;
   delimiting the area by the first constant and the second constant unless there exists some binary code representative of data between the first constant and the smallest address of the first group of address or between the largest address of the area and the second constant.

8. The method for detecting area occupied by the computer code of the core of the operating system in the memory as claimed in claim 1, wherein the core of the operating system executes in a random access memory of a virtual machine.

9. A device for detecting an area occupied by computer code of a core of an operating system in a memory, the area including one or more ranges in the memory, wherein the device comprises:
- a processor; and
- a non-transitory computer-readable medium comprising instructions stored thereon which when executed by the processor configure the device to detect the area by:
- implementing an iterative method including:
- a first iteration including:
- detecting at least one target address in the memory; and
- determining an area delimited by a first said target address and a second said target address; and
- at least a second iteration including:
- disassembling at least a part of the area determined during a preceding iteration;
- detecting at least one target address pointed to by a computer code instruction contained in the at least one disassembled part of the area; and
- determining an area delimited by a first said target address and a second target address detected during the second iteration; and
- a stopping condition being verified when no new target address was detected during a last iteration; and
- searching for an additional memory range starting just after the second target address obtained on the last iteration and including only the computer code;
- the area occupied by the computer code in the core of the operating system being delimited by the first target address obtained on the last iteration and by a largest address of the additional memory range.

10. The device as claimed in claim 9, the processor including a virtual machine and a hypervisor, which operates to detect the area occupied by the computer code of the core of the operating system when the core executes in a random access memory of the virtual machine.

11. A non-transitory computer readable medium having stored thereon instructions which, when executed by a processor, cause the processor to implement a method for detecting an area occupied by computer code of a core of an operating system in a memory, the area including one or more ranges in the memory, the detecting including:
- an iterative method including:
- a first iteration including:
- detecting at least one target address in the memory; and
- determining an area delimited by a first target address and a second target address; and
- at least a second iteration including:
- disassembling at least a part of the area determined during a preceding iteration;
- detecting at least one target address pointed to by a computer code instruction contained in the at least one disassembled part of the area; and
- determining an area delimited by a first target address and a second target address detected during the second iteration; and
- a stopping condition being verified when no new target address was detected during a last iteration; and
- searching for an additional memory range starting just after the second target address obtained on the last iteration and including only the computer code;
- the area occupied by the computer code in the core of the operating system being delimited by the first target address obtained on the last iteration and by a largest address of the additional memory range.

\* \* \* \* \*

UNITED STATES PATENT AND TRADEMARK OFFICE
CERTIFICATE OF CORRECTION

| | |
|---|---|
| PATENT NO. | : 11,768,680 B2 |
| APPLICATION NO. | : 17/622960 |
| DATED | : September 26, 2023 |
| INVENTOR(S) | : Yacine Hebbal et al. |

It is certified that error appears in the above-identified patent and that said Letters Patent is hereby corrected as shown below:

On the Title Page

In Item (86), please replace "PCT/HR2020/051100" with --PCT/FR2020/051100--.

Signed and Sealed this
Thirty-first Day of October, 2023

Katherine Kelly Vidal
*Director of the United States Patent and Trademark Office*